Aug. 12, 1924.
J. E. REDFORD
1,504,379
SLACK ADJUSTER
Filed June 14, 1922
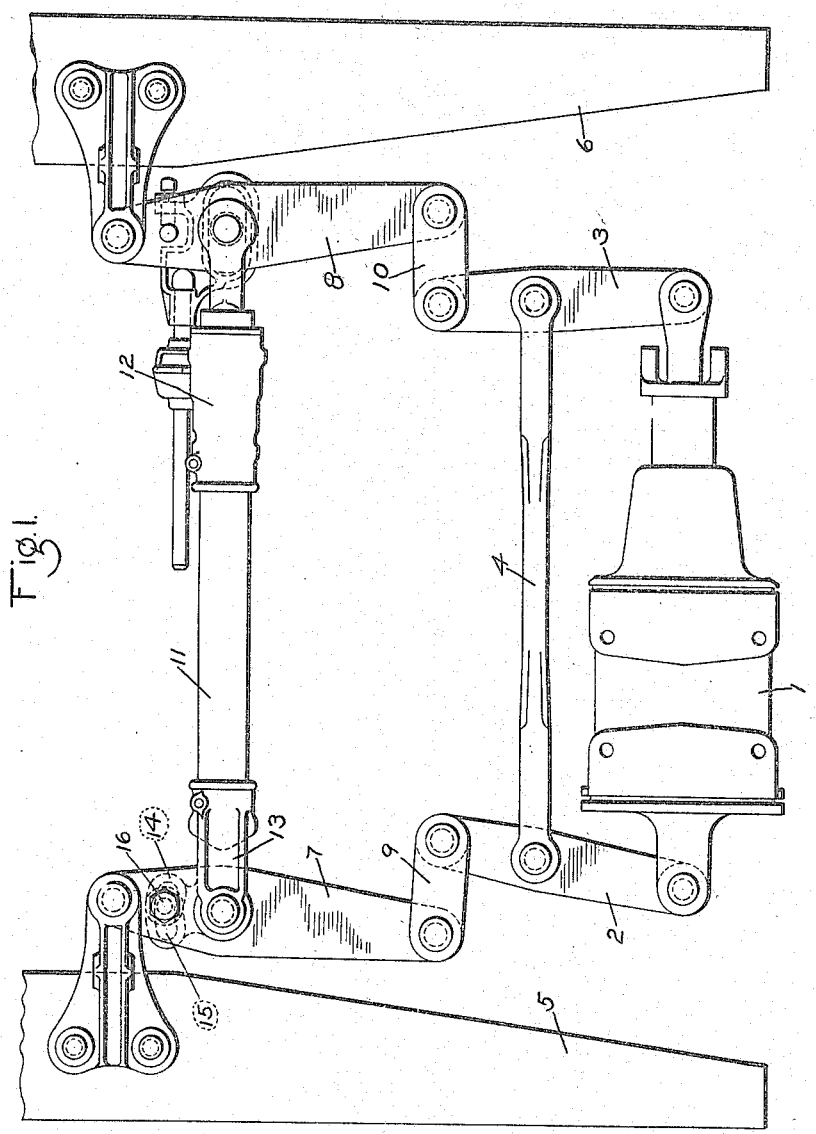
INVENTOR
JOHN E. REDFORD
BY 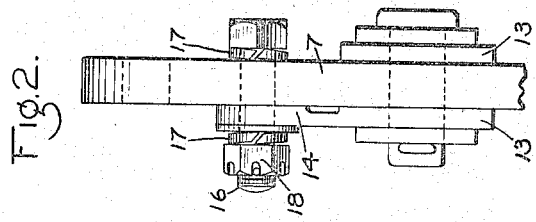
ATTORNEY Patented Aug. 12, 1924.

1,504,379

UNITED STATES PATENT OFFICE.

JOHN E. REDFORD, OF KINLOCH PARK, MISSOURI, ASSIGNOR TO THE AMERICAN BRAKE COMPANY, OF ST. LOUIS, MISSOURI, A CORPORATION OF MISSOURI.

SLACK ADJUSTER.

Application filed June 14, 1922. Serial No. 568,097.

*To all whom it may concern:*

Be it known that I, JOHN E. REDFORD, a citizen of the United States, residing at Kinloch Park, in the county of St. Louis and State of Missouri, have invented new and useful Improvements in Slack Adjusters, of which the following is a specification.

This invention relates to slack adjusters for automatically taking up slack due to the wear of brake shoes on the wheels of a car.

With certain types of automatic slack adjusters, the automatic adjusting mechanism depends for its operation upon the relative increasing angularity of the brake levers, which results from the wearing away of the brake shoes.

In some brake rigging systems, such as the so-called "pantograph" type which have been designed with the idea of securing a better distribution of the brake forces and a free and automatic adjustment of the brake lever angles, the brake lever angularity is more or less independent of the brake shoe wear, so that when a slack adjuster of the above type is applied to such a brake rigging, since the angularity of one lever might remain unchanged by brake shoe wear through the compensating movements of the other brake levers, the slack adjuster may fail to function properly.

The principal object of my invention is to provide means for overcoming the above difficulty.

For accomplishing the above object, I propose to employ a resistance element in the brake rigging, so disposed and adjusted that while the various levers will be capable of assuming their normal positions under the usual operating stresses, in the absence of such stresses, as in releasing the brakes when the slack adjuster acts, the freedom of movement of the brake levers will be more or less restricted by the action of the resistance element, so that the slack adjuster will be responsive to the degree of angularity of the brake levers as determined by the wear of the brake shoes.

In the accompanying drawing; Fig. 1 is a diagrammatic view of a brake rigging of the pantograph type, showing my improvement applied thereto; and Fig. 2 a side view of the brake lever having the resistance element associated therewith.

As shown in the drawing, there is associated with the brake cylinder 1, brake levers 2 and 3 connected by a rod 4. Pivotally connected to brake beams 5 and 6 are brake levers 7 and 8 which are connected by links 9 and 10 to the brake levers 2 and 3, it being noted that the links 9 and 10 merely represent diagrammatically the operative connections between the brake levers, which is considered sufficient for the purpose of illustrating the operation of the invention.

Pivotally connecting the brake levers 7 and 8 is a bottom rod 11 to which is applied a slack adjuster 12 of the type adapted to operate according to the degree of angularity of the brake levers for taking up slack. It is not deemed necessary for the purposes of the present invention, to show and describe the slack adjuster, but a slack adjuster of the same general character as that disclosed in my prior Patent No. 1,381,932, dated June 21, 1921, may be employed.

According to my invention, the jaw 13 of the bottom rod 11 is provided at one side with a lug 14 having a curved slot 15, to permit adjustment of the lever position, and into which extends a bolt 16. Spring washers 17 engage the head of the bolt and the nut 18 and the pressure of the lug 14 against the lever 7 may be varied by adjusting the nut 18, so as to compress or release the spring washers 17 as desired.

It will now be seen that when the brake rigging is moved, the frictional resistance set up between the brake lever 7 and the lug 14 tends to resist the movement of the parts. This resistance is not enough to interfere with the proper movement of the brake levers under stress in applying the brakes, but in the release movement the brake levers will tend to move in accordance with the angularity of the brake levers as set up when the brakes are applied and according to the wear of the brake shoes on the wheels and consequently the slack adjuster 12 will be operated as desired by the angularity of the brake levers due to the wear of the brake shoes and not being subject to angularity of the brake levers as might be set up by independent or free movement of the levers in brake riggings of the types hereinbefore described.

Having now described my invention, what I claim as new and desire to secure by Letters Patent, is:

1. The combination with a brake rigging movable in opposite directions in applying and releasing the brakes and an automatic slack adjuster for taking up slack in the brake rigging, of a yielding resistance device for opposing movement of the brake rigging, in either direction.

2. The combination with a brake rigging including brake levers and an automatic slack adjuster associated with the brake rigging and operated according to the angularity of the brake levers for taking up slack, of a frictional resistance device for opposing movement of the brake levers.

3. The combination with a brake rigging including brake levers and an automatic slack adjuster associated with the brake rigging and operated according to the angularity of the brake levers for taking up slack, of an adjustable frictional resistance device for opposing the free movement of the brake levers.

4. The combination with a brake rigging of the pantograph type including brake levers and an automatic slack adjuster associated with the brake rigging and operated according to the angularity of the brake levers for taking up slack in the brake rigging, of a frictional resistance device associated with one of the brake levers for opposing free movement of the brake levers.

5. In a brake rigging, the combination with a pair of brake levers and a rod connecting said levers, of a frictional resistance device at the connection between the rod and one of the brake levers for opposing the free movement of said brake levers.

In testimony whereof I have hereunto set my hand.

JOHN E. REDFORD.